(12) United States Patent
Sun et al.

(10) Patent No.: US 9,950,542 B2
(45) Date of Patent: Apr. 24, 2018

(54) PROCESSING DIGITAL INK INPUT SUBJECT TO MONITORING AND INTERVENTION BY AN APPLICATION PROGRAM

(71) Applicant: Microsoft Technology Licensing, LLC, Redmond, WA (US)

(72) Inventors: Yibo Sun, Bellevue, WA (US);
Krishnan Menon, Redmond, WA (US);
Connor Weins, Bellevue, WA (US);
Xiao Tu, Medina, WA (US);
Olumuyiwa Durojaiye, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/830,607

(22) Filed: Aug. 19, 2015

(65) Prior Publication Data
US 2016/0263911 A1    Sep. 15, 2016

Related U.S. Application Data

(60) Provisional application No. 62/132,428, filed on Mar. 12, 2015.

(51) Int. Cl.
| | |
|---|---|
| *B41J 2/49* | (2006.01) |
| *G06F 9/54* | (2006.01) |
| *G06F 3/038* | (2013.01) |
| *G06F 3/041* | (2006.01) |
| *G06F 3/0488* | (2013.01) |

(52) U.S. Cl.
CPC ............... *B41J 2/49* (2013.01); *G06F 3/038* (2013.01); *G06F 3/0416* (2013.01); *G06F 3/04883* (2013.01); *G06F 9/54* (2013.01)

(58) Field of Classification Search
CPC ....... G06F 3/04883; G06F 2203/04808; G06F 3/1204; G06K 9/00409
See application file for complete search history.

(56) References Cited

U.S. PATENT DOCUMENTS

| | | | | |
|---|---|---|---|---|
| 5,347,295 A | * | 9/1994 | Agulnick | G06F 1/1626 345/156 |
| 5,561,446 A | * | 10/1996 | Montlick | G06F 3/0488 345/173 |
| 5,710,831 A | * | 1/1998 | Beernink | G06F 3/04883 382/189 |

(Continued)

OTHER PUBLICATIONS

Egger, Markus, "Get Control and Performance with the Real Time Stylus API," Published on: May 17, 2006 Available at: http://www.markusegger.com/articles/Article.aspx?quickid=0512052.
Jarrett, et al., "Overview of the Managed API," Retrieved on: Mar. 13, 2015 Available at: http://people.cs.clemson.edu/~pargas/courses/cs481/fall2005/text/js014_files/viewer_r.htm.
Yeh, et al., "Iterative Design of a Paper + Digital Toolkit: Supporting Designing, Developing, and Debugging," In Technical Report, Oct. 2007, 10 pages.

(Continued)

*Primary Examiner* — John P Zimmermann
(74) *Attorney, Agent, or Firm* — Fountainhead Law Group P.C.

(57) ABSTRACT

A facility for processing ink input is described. In one example facility, the facility receives ink input from an input device. The facility generates and renders ink stroke data structures in response to received ink input in accordance with an ink input processing pipeline. The facility provides to an executing application access to information traversing the ink input processing pipeline at a selected point in the ink input processing pipeline.

18 Claims, 4 Drawing Sheets

(56) References Cited

U.S. PATENT DOCUMENTS

| | | | |
|---|---|---|---|
| 7,174,042 B1 | 2/2007 | Simmons et al. | |
| 7,436,535 B2 | 10/2008 | Dodge et al. | |
| 8,116,569 B2 | 2/2012 | Markiewicz et al. | |
| 8,160,363 B2 * | 4/2012 | Byun | G06F 3/0425 345/158 |
| 8,166,388 B2 | 4/2012 | Gounares et al. | |
| 8,189,922 B2 | 5/2012 | Zawacki et al. | |
| 9,589,241 B2 * | 3/2017 | Schneider | G06Q 10/06 |
| 2003/0214531 A1 | 11/2003 | Chambers et al. | |
| 2005/0088420 A1 | 4/2005 | Dodge et al. | |
| 2005/0289452 A1 | 12/2005 | Kashi et al. | |
| 2006/0274057 A1 | 12/2006 | Van Ness et al. | |
| 2009/0002392 A1 | 1/2009 | Hou et al. | |
| 2010/0103118 A1 | 4/2010 | Townsend et al. | |
| 2014/0210798 A1 | 7/2014 | Wilson | |
| 2014/0240322 A1 | 8/2014 | Brumer et al. | |

OTHER PUBLICATIONS

"Preview Events," Retrieved on: Mar. 23, 2015 Available at: https://msdn.microsoft.com/en-us/library/ms752279(v=vs.110).aspx.

International Search Report and Written Opinion Issued in PCT Application No. PCT/US2016/018565, dated May 11, 2016, 16 Pages.

Hong, et al., "Satin: A Toolkit For Informal Ink-Based Applications", In Proceedings of the 13th Annual ACM Symposium on User Interface Software and Technology, Nov. 1, 2000, 10 pages.

"Observer Pattern", Retrieved from <<https://en.wikipedia.org/w/index.php?title=Observer_pattern&oldid=650941501>>, Apr. 22, 2016, 4 Pages.

"International Preliminary Report on Patentability issued in PCT Application No. PCT/US2016/018565", dated Jun. 22, 2017, 10 pages.

"Second Written Opinion Issued in PCT Application No. PCT/US2016/018565", Dated Aug. 4, 2016, 9 Pages.

\* cited by examiner ink event registration table — 300

| process | type | code pointer |
|---|---|---|
| 1 | stroke | xxxxxx |
| 2 | input non-stroke | yyyyy |
| 2 | non-stroke | zzzzzz |

PROCESSING DIGITAL INK INPUT SUBJECT TO MONITORING AND INTERVENTION BY AN APPLICATION PROGRAM

CROSS-REFERENCE TO RELATED APPLICATION(S)

This application claims the benefit of U.S. Provisional Application No. 62/132,428, filed on Mar. 12, 2015, which is hereby incorporated by reference in its entirety. In cases in which a document incorporated by reference herein is inconsistent with contents of this application, the contents of this application control.

BACKGROUND

Electronic ink is content added to an electronic document based upon a user input technique where the user handwrites, draws, or performs other arbitrary spatial movements. As a result of such user input, visual marks are added to the document that correspond to the path of the movement. For example, in the case of handwriting, handwritten words appear in the document in the same handwriting style that they were executed by the user.

In some cases, the user performs this input by moving a stylus or his or her finger across the surface of the display device on which the document is displayed. In such cases, the electronic ink generally appears in the document in the positions where the interactions occurred. In some cases, the user performs the inking input by moving a displayed position pointer on the screen, using an input device such as a mouse or touchpad.

In the case of electronic ink corresponding to handwriting, handwriting recognition techniques can be used to identify text represented by the handwriting, which can be inserted in the document along with or in place of the electronic ink handwriting.

Ink is generally consumed by application programs that register to receive it. In such a case, it is typical for an ink-aware operating system to process ink-related input events to do some or all of the following automatically on behalf of the registered application: generating ink—that is, creating the data structures representing ink, including strokes interpolated and/or smoothed from a sequence of points along a movement path; rendering ink—that is, causing a visual representation of ink to be displayed in the application's display area; and/or "drying" ink by transferring the data structures that represent it to the control of the application.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for processing ink input is described. In one example facility, the facility receives ink input from an input device. The facility generates and renders ink stroke data structures in response to received ink input in accordance with an ink input processing pipeline. The facility provides to an executing application access to information traversing the ink input processing pipeline at a selected point in the ink input processing pipeline.

BRIEF DESCRIPTION OF THE DRAWINGS

FIG. 3 is a table diagram showing sample contents of an ink event registration table used by the facility in some examples to store information about applications' registration of ink event handlers.

DETAILED DESCRIPTION

Figure 1:
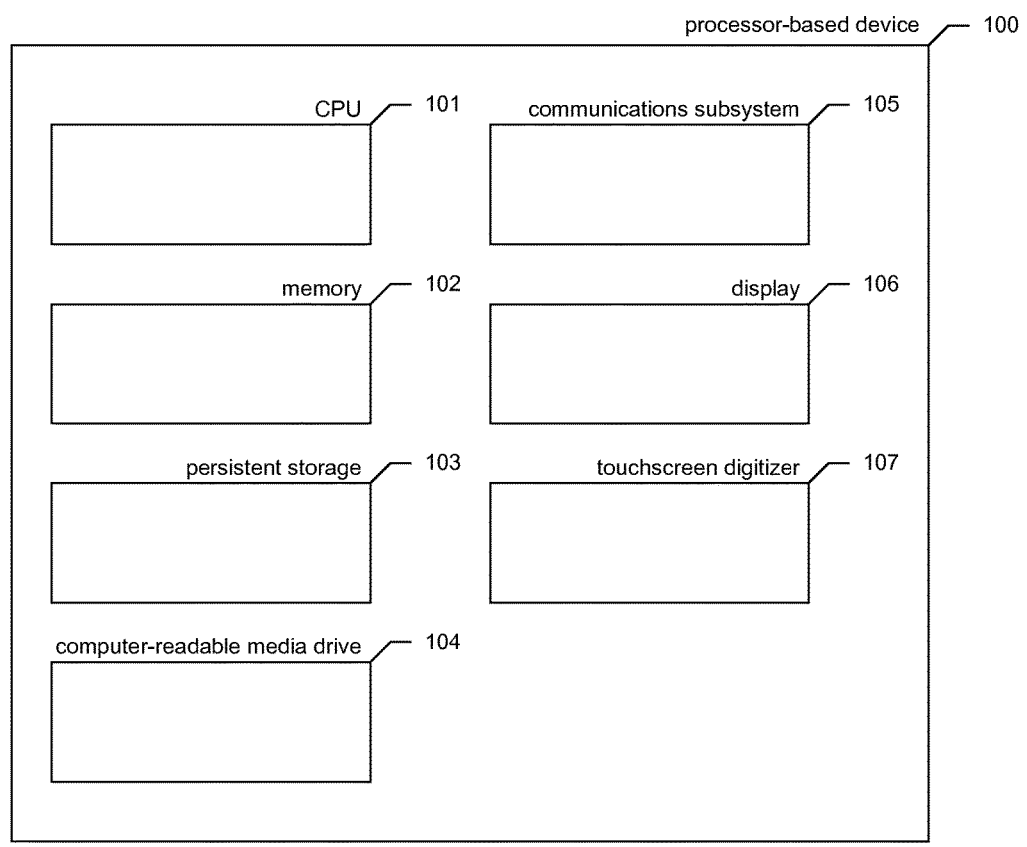
FIG. 1 is a block diagram showing some of the components that may be incorporated in at least some of the computer systems and other devices on which the facility operates.

The inventors have observed that the operating system's extensive isolation of conventional electronic ink processing systems from the applications that consume of their ink preclude these applications from implementing a variety of desirable, ink-aware features. For example, when operating in conjunction with conventional ink processing systems, such applications are generally unable to implement features such as allowing a user to invoke certain application functionality using gestures executed with a pen or other inking pointing device, such as crossing out an email message in a list of email messages in order to delete the email message from the list; preventing inking in a certain region of the application's display area that contains visual information that should not be obscured; sending ink strokes to a collaborating user's computer system as they are being composited from individual pen move inputs; implementing customized ink selection, ink erasing, and cursor hovering functionalities; etc.

In order to enable a fuller range of ink-aware features among applications, the inventors have conceived and reduced to practice a software and/or hardware facility for processing digital ink input subject to monitoring and intervention by an application program ("the facility").

In various examples, the facility permits an application to intercept information at one or more points in the operating system's ink processing pipeline, including raw device input; ink strokes generated by raw device input for rendering; and types of input not used to generate ink strokes. In some examples, the facility permits the application to register event handlers for events occurring at any of these points in the ink processing pipeline.

In some examples, the application's event handlers can use their access to events of these types to affect the behavior of the ink processing pipeline. As one example, in some cases an event handler for raw device input can, based upon analysis of this raw device input, instruct the pipeline to abort processing and rendering of an in-progress stroke, such as where a stroke would be improper in the current location of the application display area, or where the application recognizes the raw device input making up the stroke as matching a user intent other than inking a stroke, such as issuing a command to the application via a gesture.

In some examples, the facility causes the application's event handlers to execute at different levels of priority for different categories of events. In particular, in some examples, the facility causes the application's event handler for raw device input to execute in a high-priority background thread used by the pipeline to process raw device input into strokes, while causing the application's event handlers for stroke and non-stroke of events in a low-priority host thread—such as an application user interface thread—used by the application to transfer completed strokes into its own representation of the document being edited. (This transferring is sometimes referred to as "drying," and any stroke that has not been so dried—such as strokes that are in progress—are sometimes referred to as "wet.") In some examples, the facility monitors execution of application's event handlers in high-priority threads to ensure that the application's event handlers do not abuse the high priority of these threads by doing extensive processing, thus preventing such event handlers from interfering with the pipeline's prompt generation and rendering of ink strokes, which is an important part of providing a good inking experience to users.

By performing in some or all of these ways, the facility enables a wider range of useful and attractive ink-aware features on the part of applications.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, tablet computer systems, netbooks, mobile phones, personal digital assistants, televisions, cameras, automobile computers, electronic media players, electronic kiosk devices, electronic table devices, electronic whiteboard devices, etc. In various examples, the computer systems and devices may include any number of the following: a central processing unit ("CPU") 101 for executing computer programs; a computer memory 102 for storing programs and data while they are being used, including the facility and associated data, an operating system including a kernel and device drivers, and one or more applications; a persistent storage device 103, such as a hard drive or flash drive for persistently storing programs and data; a computer-readable media drive 104, such as a floppy, CD-ROM, or DVD drive, for reading programs and data stored on a computer-readable medium; and/or a communications subsystem 105 for connecting the computer system to other computer systems and/or other devices to send and/or receive data, such as via the Internet or another wired or wireless network and its networking hardware, such as switches, routers, repeaters, electrical cables and optical fibers, light emitters and receivers, radio transmitters and receivers, and the like.

In various examples, these computer systems and other devices 100 may further include any number of the following: a display 106 for presenting visual information, such as text, images, icons, documents, menus, etc.; and a touchscreen digitizer 107 for sensing interactions with the display, such as touching the display with one or more fingers, styluses, or other objects. In various examples, the touchscreen digitizer uses one or more available techniques for sensing interactions with the display, such as resistive sensing, surface acoustic wave sensing, surface capacitance sensing, projected capacitance sensing, infrared grid sensing, infrared acrylic projection sensing, optical imaging sensing, dispersive signal sensing, and acoustic pulse recognition sensing. In various examples, the computer systems and other devices 100 include input devices of various other types, such as keyboards, mice, styluses, etc. (not shown).

While computer systems configured as described above may be used to support the operation of the facility, those skilled in the art will appreciate that the facility may be implemented using devices of various types and configurations, and having various components.

Figure 2:
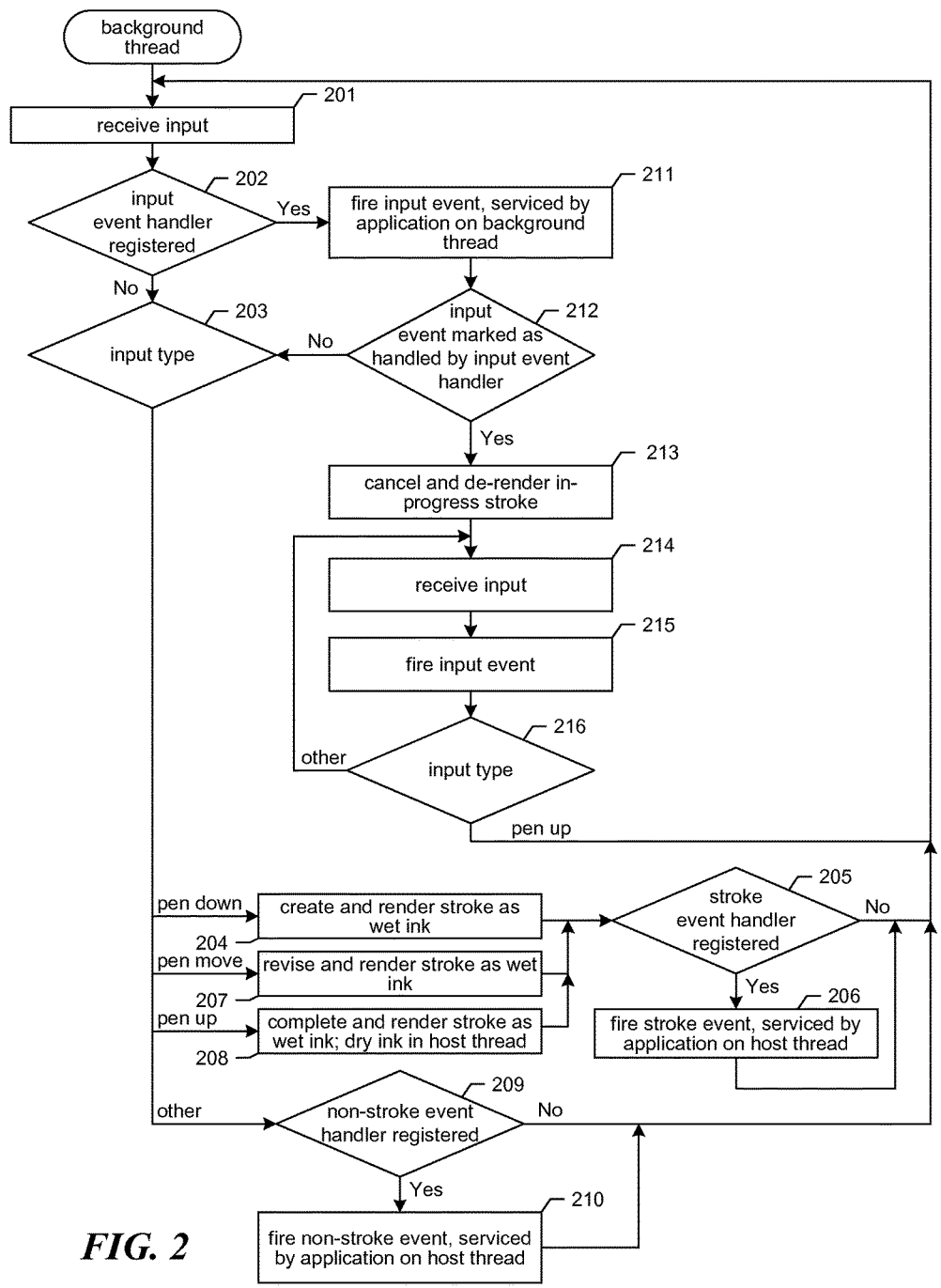
FIG. 2 is a flow diagram showing example acts that may be performed by the facility in some examples to process broad device input.

FIG. 2 is a flow diagram showing example acts that may be performed by the facility in some examples to process broad device input. In some examples, the facility performs the acts of FIG. 2 in a thread having high execution priority, such as a background thread for generating and rendering ink strokes.

At 201, the facility receives device input. If the application has registered an input event handler for receiving device input, then the facility continues at 211, else the facility continues at 203. In various examples, the facility provides various mechanisms for an application to register an event handler, such as calling an operating system API, calling an ink system API, storing one or more key/value pairs in the registry, etc. At 203, the facility branches on the type of the input received at 201: if the input is pen down input—such as input indicating that the user has touched the display with a finger, or stylus, or another object, or activated another type of pointing input device such as by pressing down the button on a mouse—the facility continues at 204; if the input is pen move input reflecting the movement of the pointing device following pen down input and preceding pen up input, then the facility continues at 207; if the input is pen up input reflecting the removal of the finger or other object touching the display, the release of the mouse button, etc., then the facility continues at 208; and if the input is a type of input no named, then the facility continues at 209.

At 204, where the received input is pen down input, the facility creates and renders an ink stroke as wet ink. Often this new stroke is a single point, or a very short line segment. At 205, if the application has registered a stroke event handler, then the facility continues at 206, else the facility returns to 201 to receive the next device input. At 206, the facility fires a stroke event that is serviced by the application on the low-priority host thread, such as the application's user interface thread. In various examples, the stroke handler can perform processing such as sending strokes to a remote computer system as they are formed, such as sending them to a computer system being used by a collaborating user who can then watch as the present user forms strokes with ink input. After 206, the facility returns to 201.

At 207, where the input is pen move input, the facility revises and renders the in-progress stroke as wet ink. In some examples, such revision involves extending the stroke to a new point that is the destination of the move input, smoothing the shape of the stroke in light of this extension, etc. After 207, the facility continues at 205.

At 208, where the input is pen up input, the facility completes and renders the in-progress stroke as wet ink, and causes this wet ink to be dried in the host thread. After 208, the facility continues at 205.

At 209, where the input is other input, if the application has registered a non-stroke event handler, then the facility continues at 210, else the facility returns to 201. In various examples, this other input can be of various types, such as hovering, erasing, pressing a stylus barrel button, clicking a mouse's right button, etc. At 210, the facility fires a stroke event, serviced by the application on the host thread. In various examples, the non-stroke event handler performs various processing, such as performing custom forms of erasing, selection of ink and other content, hovering, etc. After 210, the facility returns to 201.

In some examples, the facility fires stroke events and non-stroke events at 206 and 210, respectively, in such a manner that each event is received by the application's event handlers independently. In some examples, however, the facility accumulates a sequence of such events in a queue, where the sequence can be consumed together by the application's event handler. In some examples, the facility's treatment of such events is configurable by the application, such as by specifying whether this queuing should be performed in the application's registration of an event handler, in some subsequent call to the operating system, etc.

In 211, where the application has registered an input event handler for raw device input events, the facility fires an input event corresponding to the input received at 201. The input event is serviced by the application on the high-priority background thread. In various examples, the input event handler performs various processing, such as detecting a gesture and invoking a corresponding command in response; preventing inking in a forbidden region; etc. As part of servicing the input event, the application's input event handler can determine whether the input event should be marked as "handled," reflecting that the application is claiming the device input that makes up any current in-progress stroke, and that this device input should not be processed by the pipeline. Accordingly, at 212, if the device input is marked as handled by the input event handler, then the facility continues at 213, else the facility continues at 203. At 213, the facility cancels and de-renders the in-process stroke. At 214, the facility receives additional device input. At 215, the facility fires an input event in a manner similar to act 211, that corresponds to the input received at 214. At 216, if the type of the input is pen up input, then the facility returns to 201, else the facility returns to 214.

Those skilled in the art will appreciate that the acts shown in FIG. 2 may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

As a further example of the facility's operation, an application can interact with the facility in such a way as to drag selected ink to a new location. In this example, the application's input event handler processes a pen down action and determines that the pen down occurred inside a selected region, such as a selected rectangle. The input event handler calls an input configuration API to notify the operating system that the present input sequence should be directed to the host thread as non-stroke events. In the host thread, the application processes the pen down action and subsequent pen move actions by dragging the selected ink strokes in accordance with the pen move actions.

FIG. 3 is a table diagram showing sample contents of an ink event registration table used by the facility in some examples to store information about applications' registration of ink event handlers. The table 300 is made up of rows, such as rows 301-303, each corresponding to a different event handler registered by an application. Each row is made up of the following columns: a process column 311 containing identifier for the process in which the application that registered the event handler is executing; a type column 312 indicating the category of events—input, stroke, or non-stroke—for which the event handler is registered; and a code pointer column 313 containing an entry point for the event handler, or other information that can be used to invoke the event handler as part of firing an event of the registered category. For example, row 301 indicates that an application executing in process 1 has registered a stroke event handler having entry point XXXXXX. According to the state of the table, this application has not registered an event handler for either input events or non-stroke events. On the other hand, rows 302-303 indicate that an application executing in process 2 has registered event handlers for both input events and non-stroke events, but has not registered an event handler for stroke events.

While FIG. 3 shows a table whose contents and organization are designed to make it more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown; etc.

Figure 4:
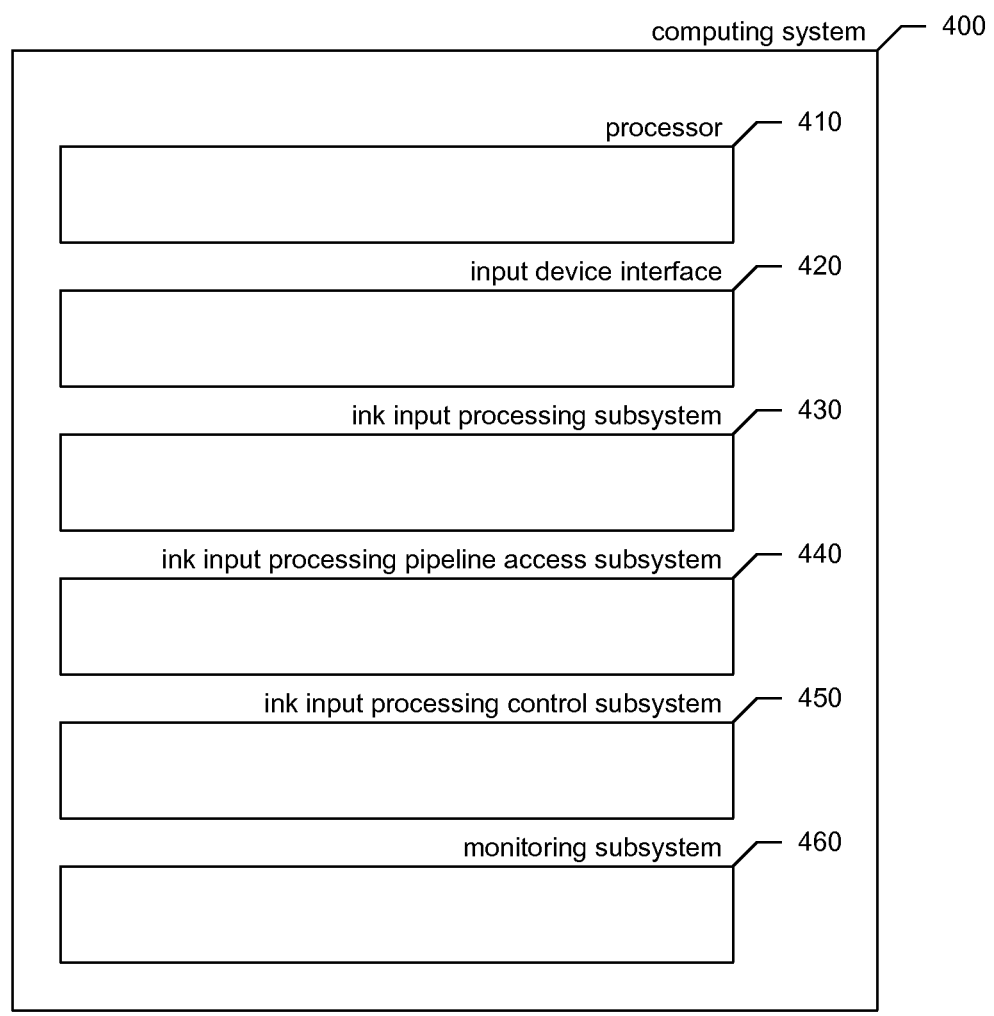
FIG. 4 is a block diagram showing some of the components that may be incorporated in at least some of the computer systems and other devices on which the facility operates.

FIG. 4 is a block diagram showing some of the components that may be incorporated in at least some of the computer systems and other devices on which the facility operates. The computing system 400 includes a processor 410 configured to execute an application. The computing system further includes an input device interface 420 configured to receive ink input from an input device. The computing system also includes an ink input processing subsystem 430 configured to generate and render ink stroke data structures. It does so in response to ink input received from an input device by the input device interface, in accordance with an ink input processing pipeline. The computing system also includes an ink input processing pipeline access subsystem 440 configured to provide to the application executed by the processor access to information traversing the ink input processing pipeline at a selected point in the ink input processing pipeline. The computing system further includes an ink input processing control system 450 configured to, in response to receiving from the application executed on the processor an instruction, omitting to generate and render ink stroke data structures with respect to a selected portion of ink input received by the input device interface. The computing system also includes a monitoring subsystem 460 configured to monitor use of processing resources by an event handler that is part of the application executed by the processor.

In some examples, the facility provides a computing system for processing ink input, comprising: a processor configured to execute an application; an input device interface configured to receive ink input; an ink input processing subsystem configured to generate and render ink stroke data structures in response to ink input received by the input device interface in accordance with an ink input processing pipeline; and an ink input processing pipeline access subsystem configured to provide to the application executed by the processor access to information traversing the ink input processing pipeline at a selected point in the ink input processing pipeline.

In some examples, the facility provides a method in a computing system for processing ink input in connection with an application program, the method comprising: permitting the application program to register an event handler for input events; permitting the application program to register an event handler for stroke events; receiving input events from an input device; in response to the application registering an event handler for input events, providing access to the received input events to the registered event handler for input events; processing at least a portion of the input events to generate a plurality of ink strokes; and in response to the application registering an event handler for stroke events, providing access to the generated strokes to the registered event handler for stroke events.

In some examples, the facility provides a computer-readable medium having contents configured to cause a computing system to, in order to handle inking input: in an operating system: invoke an application; receive a stream of inking input events; for each inking input event received by the operating system, before generating ink based on the inking input event, provide to code specified as part of the invoked application access to the inking input event; and for each of at least a first portion of the inking input events received by the operating system, after providing to code specified as part of the invoked application access to the inking input event, generate ink based on the inking input event.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A computing system for processing ink input, comprising:
    at least one processor configured to execute an application configured to consume ink stroke data structures;
    an input device interface configured to receive ink input;
    an ink input processing subsystem configured to generate and render ink stroke data structures based at least on ink input received by the input device using an ink input processing pipeline, the ink input processing pipeline managing a process of subjecting received ink input first to ink stroke generation, then to ink stroke display; and
    an ink input processing pipeline access subsystem configured to provide to the application configured to consume ink stroke data structures executed by the at least one processor access to information traversing the ink input processing pipeline at a selected point in the ink input processing pipeline before ink stroke display,
    wherein the selected point in the ink input processing pipeline is a point in the ink input processing pipeline before generation of ink stroke data structures,
    wherein the application executed by the at least one processor comprises an event handler,
    wherein the ink input processing pipeline access subsystem is further configured to provide access via the event handler, and wherein the event handler is executed by the at least one processor in a high-priority thread,
    further comprising:
    a regulation subsystem configured to limit the amount of the event handler's use of processing resources in the high-priority thread.

2. The computing system of claim 1, further comprising:
    an ink input processing control subsystem configured to:
    receive from the application executed on the at least one processor an instruction, and based at least on the instruction, omit generating and rendering ink stroke data structures with respect to a selected portion of ink input received by the input device interface.

3. The computing system of claim 1 wherein the high-priority thread in which the event handler is executed also executes code for the ink input processing subsystem.

4. The computing system of claim 1 wherein the selected point in the ink input processing pipeline is a point in the ink input processing pipeline traversed by ink input of one or more types not used by the ink input processing system to generate and render ink stroke data structures.

5. A method in a computing system for processing ink input in connection with an application program, the method comprising:
    permitting the application program to register an event handler for input events;
    permitting the application program to register an event handler for stroke events;
    receiving input events from an input device;
    based at least on the application registering an event handler for input events, providing access to the received input events to the registered event handler for input events;
    processing at least a portion of the input events to generate a plurality of ink strokes;
    based at least on the application registering the event handler for stroke events, providing access to the generated strokes to the registered event handler for stroke events; and
    based at least on the application registering the event handler for input events, limiting the amount of consumption of processing resources by the registered event handler for input events.

6. The method of claim 5, further comprising:
    permitting the application program to register an event handler for non-stroke events; and
    based at least on the application registering the event handler for non-stroke events, providing access to received input events not used in generating ink strokes to the registered event handler for non-stroke events.

7. The method of claim 5, further comprising:
    receiving from the application program a direction to cancel a selected generated ink stroke; and
    based at least on receiving the direction, canceling the selected generated ink stroke.

8. The method of claim 7, further comprising:
    causing the selected generated ink stroke to be de-rendered; and
    deleting the selected generated ink stroke.

9. The method of claim 7 wherein the selected generated ink stroke is incomplete at a time when the direction is received.

10. The method of claim 7 wherein the application program generates the received direction to cancel a selected generated ink stroke in response to recognizing input events corresponding to the selected generated ink stroke as an application control gesture.

11. The method of claim 5 wherein providing access to the generated strokes to the registered event handler for stroke events comprises storing information about the generated strokes in a queue to which the registered event handler for stroke events has access.

12. A computer-readable medium having contents configured to cause a computing system to, in order to handle inking input:
    in an operating system:
    invoke an application;
    receive a stream of inking input events;
    for each inking input event received by the operating system, before generating ink based on the inking input event, provide to code specified as part of the invoked application access to the inking input event;
    for each of at least a first portion of the inking input events received by the operating system, after providing to code specified as part of the invoked application access to the inking input event, generate ink based on the inking input event; and based at least on the application registering an event handler for input events, limiting the amount of consumption of processing resources by the registered event handler for input events.

13. The computer-readable medium of claim 12 wherein the computer-readable medium has contents configured to further cause a computing system to:

in the operating system,
receive from the code specified as part of the invoked application a direction with respect to a distinguished inking input event to which access was provided, wherein, based at least on receiving the direction, generation of ink based on the distinguished inking input event in the operating system is performed in accordance with the received direction.

14. The computer-readable medium of claim 12 wherein the computer-readable medium has contents configured to further cause a computing system to:

in the operating system,
receive from the code specified as part of the invoked application a direction with respect to a distinguished inking input event to which access was provided, wherein, based at least on receiving the direction, the distinguished inking input event is not among the inking input events for which ink generation is performed in the operating system.

15. The computer-readable medium of claim 12 wherein the computer-readable medium has contents configured to further cause a computing system to:

in the operating system:
for each of at least a second portion of the inking input events received by the operating system, render ink based on the inking input event; and
receive from the code specified as part of the invoked application a direction with respect to a distinguished inking input event to which access was provided, wherein, based at least on receiving the direction, the distinguished inking input event is not among the inking input events for which ink rendering is performed in the operating system.

16. A computing system for processing ink input, comprising:

at least one processor configured to execute an application configured to consume ink stroke data structures;
an input device interface configured to receive ink input;
an ink input processing subsystem configured to generate and render ink stroke data structures based at least on ink input received by the input device using an ink input processing pipeline, the ink input processing pipeline managing a process of subjecting received ink input first to ink stroke generation, then to ink stroke display;
an ink input processing pipeline access subsystem configured to provide to the application configured to consume ink stroke data structures executed by the at least one processor access to information traversing the ink input processing pipeline at a selected point in the ink input processing pipeline before ink stroke display; and
a regulator configured to, based at least on the application registering an event handler for input events, limit the amount of consumption of processing resources by the registered event handler for input events.

17. A computing system for processing ink input, comprising:

at least one processor configured to execute an application configured to consume ink stroke data structures;
an input device interface configured to receive ink input;
an ink input processing subsystem configured to generate and render ink stroke data structures based at least on ink input received by the input device using an ink input processing pipeline, the ink input processing pipeline managing a process of subjecting received ink input first to ink stroke generation, then to ink stroke display;
an ink input processing pipeline access subsystem configured to provide to the application configured to consume ink stroke data structures executed by the at least one processor access to information traversing the ink input processing pipeline at a selected point in the ink input processing pipeline before ink stroke display;
a receiver configured to receive from the application program a direction to cancel a selected generated ink stroke; and
a cancelling subsystem to, based at least on receiving the direction, cancel the selected ink stroke.

18. The computing system of claim 14 wherein the direction to cancel a selected generated ink stroke received from the application program by the receiver is generated by the application program in response to recognizing input events corresponding to the selected generated ink stroke as an application control gesture.

* * * * *